United States Patent
Hsieh

(10) Patent No.: US 9,288,475 B2
(45) Date of Patent: Mar. 15, 2016

(54) 3D IMAGE-CAPTURING METHOD, 3D CAMERA AND LEVEL-ALIGNMENT MACHINE FOR 3D CAMERA

(71) Applicant: Silicon Motion, Inc., Jhubei, Hsinchu County (TW)

(72) Inventor: Chao-Kuei Hsieh, New Taipei (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 428 days.

(21) Appl. No.: 13/788,475

(22) Filed: Mar. 7, 2013

(65) Prior Publication Data

US 2013/0235162 A1 Sep. 12, 2013

(30) Foreign Application Priority Data

Mar. 12, 2012 (TW) .............................. 101108244 A

(51) Int. Cl.
*H04N 13/02* (2006.01)
*G06T 7/00* (2006.01)

(52) U.S. Cl.
CPC ............ *H04N 13/0239* (2013.01); *G06T 7/002* (2013.01); *G06T 7/0026* (2013.01); *H04N 13/0246* (2013.01); *G06T 2207/10012* (2013.01); *G06T 2207/20068* (2013.01)

(58) Field of Classification Search
CPC ........... H04N 13/0239; H04N 13/0246; G06T 7/0026; G06T 7/002; G06T 2207/20068; G06T 2207/10012
See application file for complete search history.

(56) References Cited

U.S. PATENT DOCUMENTS

| 8,849,010 | B2 | 9/2014 | Li et al. | |
|---|---|---|---|---|
| 2011/0149054 | A1* | 6/2011 | Yun et al. | 348/58 |
| 2012/0148147 | A1* | 6/2012 | Ogata et al. | 382/154 |
| 2012/0236124 | A1* | 9/2012 | Aoki | 348/47 |

FOREIGN PATENT DOCUMENTS

| CN | 101236653 | 8/2008 |
|---|---|---|
| CN | 101577004 | 11/2009 |
| CN | 102325262 | 1/2012 |
| CN | 102036094 | 2/2012 |
| WO | WO 2006/020257 | 2/2006 |

OTHER PUBLICATIONS

English language translation of abstract of CN 102325262 (published Jan. 18, 2012).

(Continued)

*Primary Examiner* — Sath V Perungavoor
*Assistant Examiner* — Peter D Le
(74) *Attorney, Agent, or Firm* — McClure, Qualey & Rodack, LLP

(57) ABSTRACT

A 3D image-capturing method, a 3D camera and a level-alignment machine for a 3D camera are disclosed. The method includes the following steps: capturing a left- and a right-eye image by a left- and a right-eye camera, respectively; comparing the left- and right-eye images to observe similar columns between the left- and right-eye images; comparing the left- and right-eye images once again over the similar columns to observe similar rows between the left- and right-eye images; and, referring to the similar columns between the left- and right-eye images, vertically shifting the left- and right-eye images to horizontally align the left- and right-eye images to generate a 3D image.

16 Claims, 8 Drawing Sheets

(56) References Cited

OTHER PUBLICATIONS

English language translation of abstract of CN 102036094 (published Feb. 1, 2012).
English language translation of abstract of CN 101236653 (published Aug. 6, 2008).
English language translation of abstract of CN 101577004 (published Nov. 11, 2009).
Lin, G.Y., et al.; "An Effective Robust Rectification Method for S209tereo Vision;" Journal of Image and Graphics; vol. 11; No. 2; Feb. 2009; pp. 203-209.

* cited by examiner

US 9,288,475 B2

3D IMAGE-CAPTURING METHOD, 3D CAMERA AND LEVEL-ALIGNMENT MACHINE FOR 3D CAMERA

CROSS REFERENCE TO RELATED APPLICATIONS

This Application claims priority of Taiwan Patent Application No. 101108244, filed on Mar. 12, 2012, the entirety of which is incorporated by reference herein.

BACKGROUND OF THE INVENTION

1. Field of the Invention

The present invention relates to 3D image-capturing methods, and in particular relates to the horizontal alignment between a left-eye image and a right-eye image for forming a 3D image.

2. Description of the Related Art

Generally, two cameras imitating human eyes are required for the generation of a 3D image. However, due to mechanical errors between cameras, a left-eye image captured by a left-eye camera may be not horizontally aligned to the corresponding right-eye image captured by a right-eye camera. For example, an object may be captured at a lower level in the left-eye image in comparison with the right-eye image (referring to FIG. 4). The horizontal error between the left- and right-eye images may result in a poor 3D image. Thus, horizontal alignment between the left- and right-eye images is required.

BRIEF SUMMARY OF THE INVENTION

A 3D image-capturing method, a 3D image camera and a level-alignment machine for a 3D camera are disclosed.

A 3D image-capturing method in accordance with an exemplary embodiment of the invention comprises the following steps: capturing a left-eye image with a left-eye camera and capturing a right-eye image with a right-eye camera; comparing the left- and right-eye images to observe similar columns between the left- and right-eye images and thereby obtaining a first-column range in the left-eye image and a second-column range in the right-eye image which indicate similar columns; comparing the left-eye image within the first-column range with the right-eye image within the second-column range to observe similar rows between the left- and right-eye images and thereby obtaining a first-row range in the left-eye image and a second-row range in the right-eye image which indicate similar rows; and, in accordance with the first-row range obtained in the left-eye image and the second-row range obtained in the right-eye image, vertically shifting the left- and right-eye images to horizontally align the left- and right-eye images to generate a 3D image.

A 3D camera in accordance with an exemplary embodiment of the invention comprises a left-eye camera, a right-eye camera and a control module. The control module is configured to: control the left- and right-eye cameras to capture a left-eye image and a right-eye image, respectively; compare the left- and right-eye images to observe similar columns between the left- and right-eye images and thereby obtain a first-column range in the left-eye image and a second-column range in the right-eye image which indicate similar columns; compare the left-eye image within the first-column range with the right-eye image within the second-column range to observe similar rows between the left- and right-eye images and thereby obtain a first-row range in the left-eye image and a second-row range in the right-eye image which indicate similar rows; and, in accordance with the first-row range obtained in the left-eye image and the second-row range obtained in the right-eye image, vertically shift the left- and right-eye images to horizontally align the left- and right-eye images to generate a 3D image.

In another exemplary embodiment, a level-alignment machine for a 3D camera is disclosed. The machine comprises a connection seat and a computing unit coupled to the connection seat. By the connection seat, an image-capturing module is assembled on the level-alignment machine. The image-capturing module is operative to capture a left-eye image and a right-eye image for the generation of a 3D image. The computing unit is configured to: receive the left- and right-eye images captured by the image-capturing module; compare the left- and right-eye images to observe similar columns between the left- and right-eye images and thereby obtain a first-column range in the left-eye image and a second-column range in the right-eye image which indicate similar columns; compare the left-eye image within the first-column range with the right-eye image within the second-column range to observe similar rows between the left- and right-eye images and thereby obtain a first-row range in the left-eye image and a second-row range in the right-eye image which indicate similar rows; and set a left-eye image vertical shift parameter and a right-eye image vertical shift parameter based on the first-row range obtained in the left-eye image and the second-row range obtained in the right-eye image, to vertically shift the left- and right-eye images based on the first and second vertical shift parameters for horizontal alignment between the left- and right-eye images.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows several exemplary embodiments carrying out the invention. This description is made for the purpose of illustrating the general principles of the invention and should not be taken in a limiting sense. The scope of the invention is best determined by reference to the appended claims.

Figure 1:
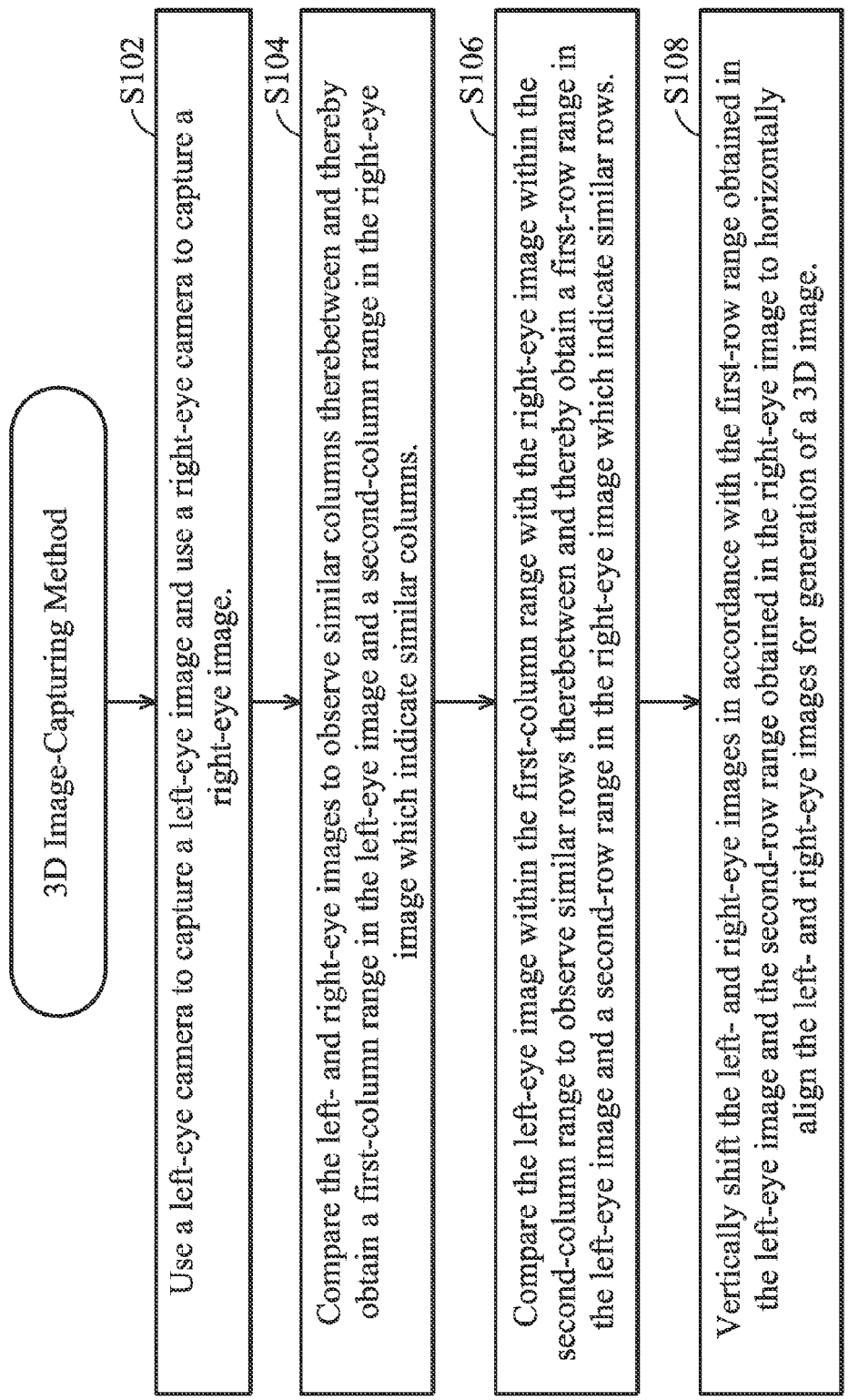
FIG. 1 is a flowchart depicting a 3D image-capturing method in accordance with an exemplary embodiment of the invention.

FIG. 1 shows a flowchart depicting an image-capturing method in accordance with an exemplary embodiment of the invention. In step S102, a left-eye image is captured by a left-eye camera and a right-eye image is captured by a right-eye camera. In step S104, the left- and right-eye images are compared with each other for observation of similar columns therebetween and thereby a first-column range and a second-column range are obtained in the left-eye image and the right-eye image, respectively, to indicate similar columns. In step S106, the left-eye image within the first-column range is compared with the right-eye images within the second-column range for observation of similar rows between the left- and right-eye images and thereby a first-row range and a second-row range are obtained in the left- and right-eye images, respectively, to indicate similar rows. In step S108, the left- and right-eye images are vertically shifted in accordance with the first-row range obtained in the left-eye image and the second-row range obtained in the right-eye image to horizontally align the left- and right-eye images to generate a 3D image.

Figure 2:
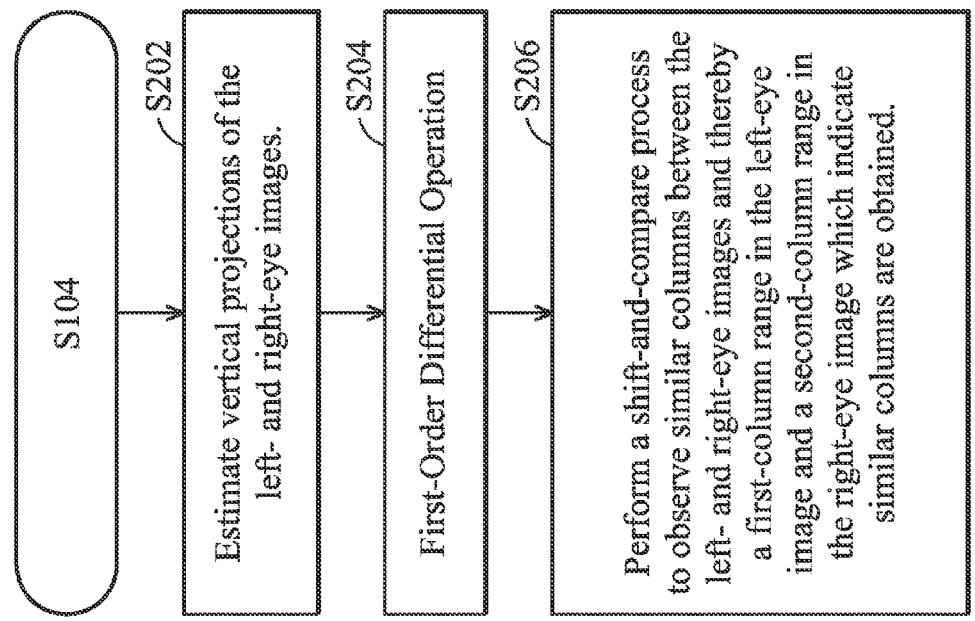
FIG. 2 shows a flowchart depicting details of step S104 in accordance with an exemplary embodiment of the invention.

FIG. 2 shows a flowchart, wherein, in accordance with an exemplary embodiment of the invention, details of step S104 are shown. In step S202, vertical projections of the left- and right-eye images captured in step S102 are estimated. In step S204, a first-order differential operation is provided, and the vertical projection of the left-eye image and the vertical projection of the right-eye image are differentiated by the first-order differential operation, respectively. In step S206, the first-order differentiated vertical projection of the left-eye image and the first-order differentiated vertical projection of the right-eye image are shifted relative to each other step by step and are compared to each other between every shift for observation of similar columns between the left- and right-eye images and thereby a first-column range in the left-eye image and a second-column range in the right-eye image which indicate similar columns are obtained. In other exemplary embodiments, the first-order differential operation is not utilized, wherein step S204 is bypassed and the shift-and-compare process of step S206 is directly performed on the vertical projections of the left- and right-eye images for observation of similar columns between the left- and right-eye images.

Figure 3:
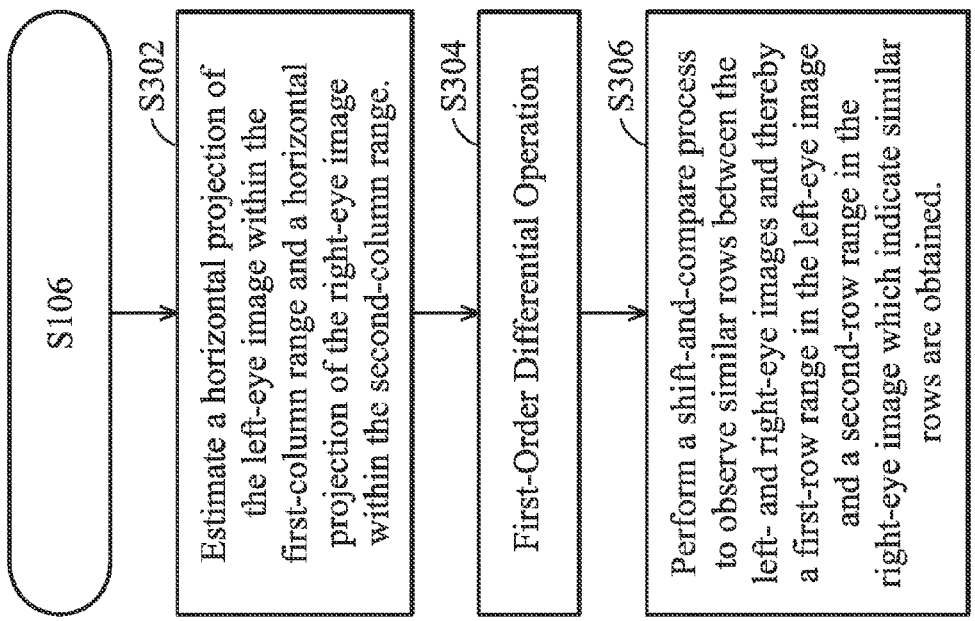
FIG. 3 shows a flowchart depicting details of step S106 in accordance with an exemplary embodiment of the invention.

FIG. 3 shows a flowchart, wherein, in accordance with an exemplary embodiment of the invention, details of step S106 are shown. In step S302, a horizontal projection of the left-eye image within the first-column range obtained in step S104 and a horizontal projection of the right-eye image within the second-column range obtained in step S104 are estimated. In step S304, a first-order differential operation is provided, and the horizontal projection of the left-eye image and the horizontal projection of the right-eye image are differentiated by the first-order differential operation, respectively. In step S306, the first-order differentiated horizontal projection of the left-eye image and the first-order differentiated horizontal projection of the right-eye image are shifted relative to each other step by step and are compared to each other between every shift for observation of similar rows between the left- and right-eye images, and thereby a first-row range in the left-eye image and a second-row range in the right-eye image which indicate similar rows are obtained. In other exemplary embodiments, the first-order differential operation is not utilized, wherein step S304 is bypassed and the shift-and-compare process of step S306 is performed directly on the horizontal projection of the left-eye image and the horizontal projection of the right-eye image for observation of similar rows between the left- and right-eye images.

Referring to FIGS. 4 to 7, an exemplary embodiment of the disclosure is discussed in the following paragraphs.

Figure 4:
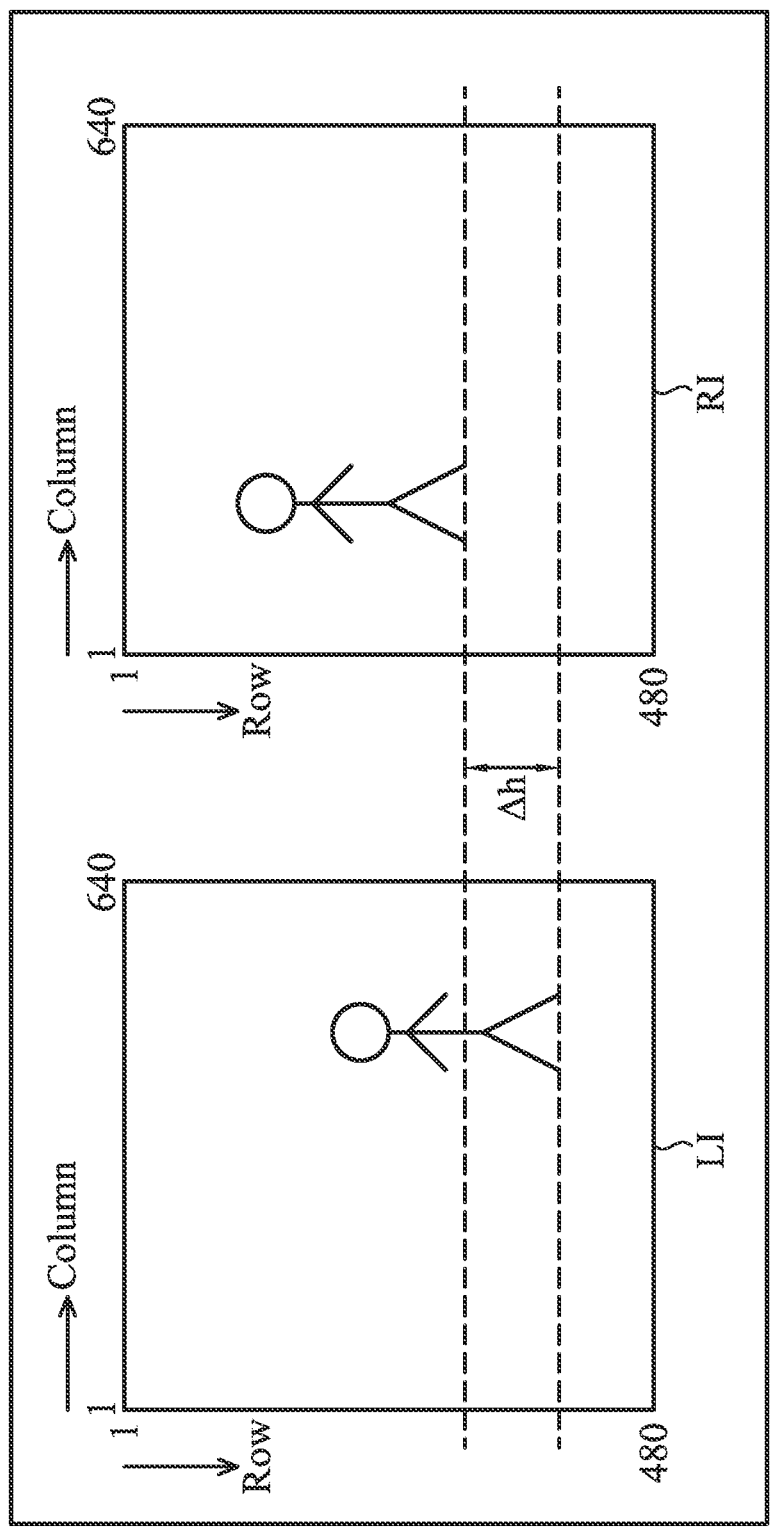
FIG. 4 shows a left-eye image LI and a right-eye image RI which have not been horizontally aligned, wherein there is a level difference Δh between the left- and right-eye images LI and RI.

FIG. 4 shows a left-eye image LI and a right-eye image RI which have not been horizontally aligned, wherein there is a level difference $\Delta h$ between the left-eye and right-eye images LI and RI.

Figure 5A:
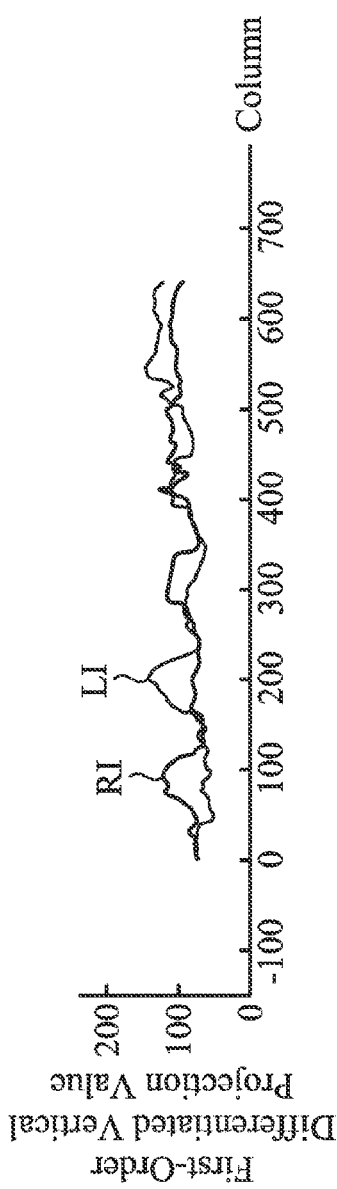
FIG. 5A shows what the data of the left- and right-eye images LI and RI are transformed into by steps S202 and S204.

FIG. 5A shows what the data of the left- and right-eye images LI and RI are transformed into by steps S202 and S204. In an exemplary embodiment, pixel data are averaged for each column to estimate a vertical projection of an image. For example, to calculate a vertical projection value of a first column, pixel data from the first row to the $480^{th}$ row of the first column are accumulated and averaged; similarly, vertical projection values of other columns are calculated and thereby a vertical projection of an image is estimated. In an exemplary embodiment, when the first-order differential operation is performed, a vertical projection value of the $(n-1)^{th}$ column of an image is subtracted from a vertical projection value of the $n^{th}$ column of the image to show a variation between adjacent columns. Note that modifications on the vertical projection estimation and the first-order differential operation are allowed.

Figure 5B:
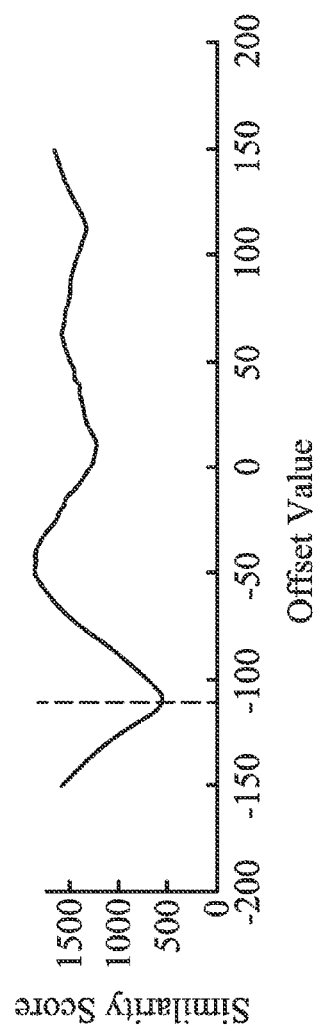
FIG. 5B shows what the data of FIG. 5A are transformed into by the shift-and-compare process of step S206.

FIG. 5B shows what the data of FIG. 5A are transformed into by the shift-and-compare process of step S206. In an exemplary embodiment, the index of the data LI (or RI) of FIG. 5A is shifted by an offset value and then the index-shifted data of LI (or RI) is compared to the non-shifted data RI (or LI) to calculate a similarity score therebetween. In the embodiment of this figure, a lower similarity score represents a higher similarity.

Figure 5C:
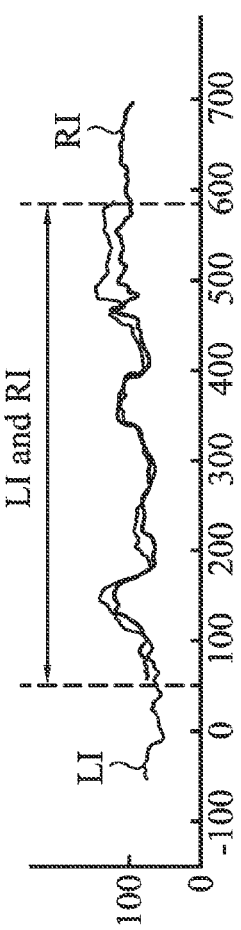
FIG. 5C is created in accordance with an offset value indicated in FIG. 5B and corresponds to the lowest value of similarity score, in which the similar columns between the left- and right-eye images LI and RI are indicated.

By referring to the lowest point of the waveform shown in FIG. 5B, an offset value corresponding thereto is obtained. FIG. 5C is created in accordance with the obtained offset value, in which the similar columns between the left- and right-eye images LI and RI are indicated.

Figure 6A:
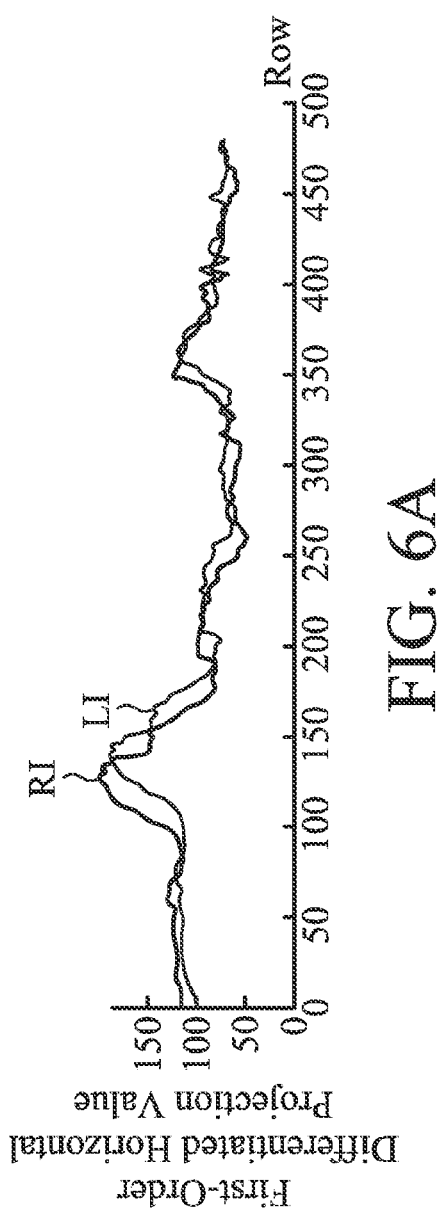
FIG. 6A shows what the data of similar columns (indicated in FIG. 5C) between the left- and right-eye images LI and RI are transformed into by steps S302 and S304.

FIG. 6A shows what the data of similar columns (indicated in FIG. 5C) between the left- and right-eye images LI and RI are transformed into by steps S302 and S304. In an exemplary embodiment, pixel data are averaged for each row to estimate the horizontal projection of an image. For example, to calculate the horizontal projection value of a first row, pixel data from the first column to the $640^{th}$ column of the first row are accumulated and averaged; similarly, the horizontal projection values of other rows are calculated and thereby the horizontal projection of an image is estimated. In an exemplary embodiment, when the first-order differential operation is performed, the horizontal projection value of the $(n-1)^{th}$ column of an image is subtracted from the horizontal projection value of the $n^{th}$ column of the image to show a variation between adjacent rows. Note that modifications on the horizontal projection estimation and the first-order differential operation are allowed.

Figure 6B:
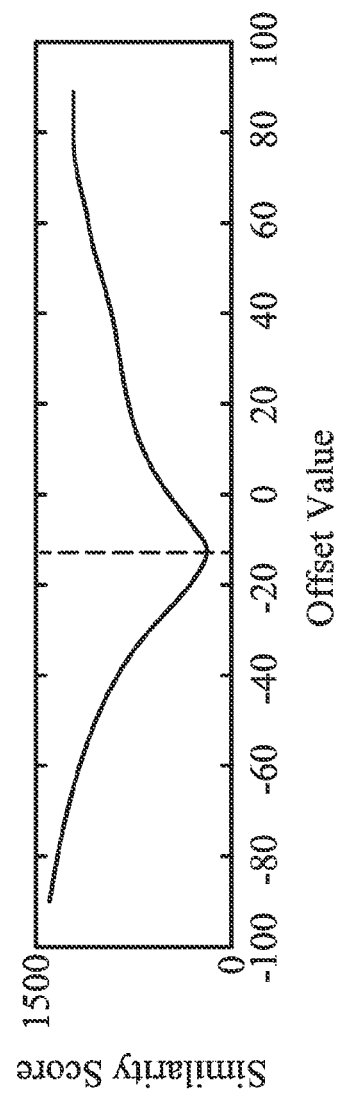
FIG. 6B shows what the data of FIG. 6A are transformed into by the shift-and-compare process of step S306.

FIG. 6B shows what the data of FIG. 6A are transformed into by the shift-and-compare process of step S306. In an exemplary embodiment, the index of the data LI (or RI) of FIG. 6A is shifted by an offset value and then the index-shifted data of LI (or RI) is compared to the non-shifted data RI (or LI) to calculate a similarity score therebetween. In the embodiment of this figure, a lower similarity score represents a higher similarity. By referring to the lowest similarity score shown in FIG. 6B, an offset value corresponding thereto is obtained for observation of the similar rows between the left- and right-eye images LI and RI.

Figure 7:
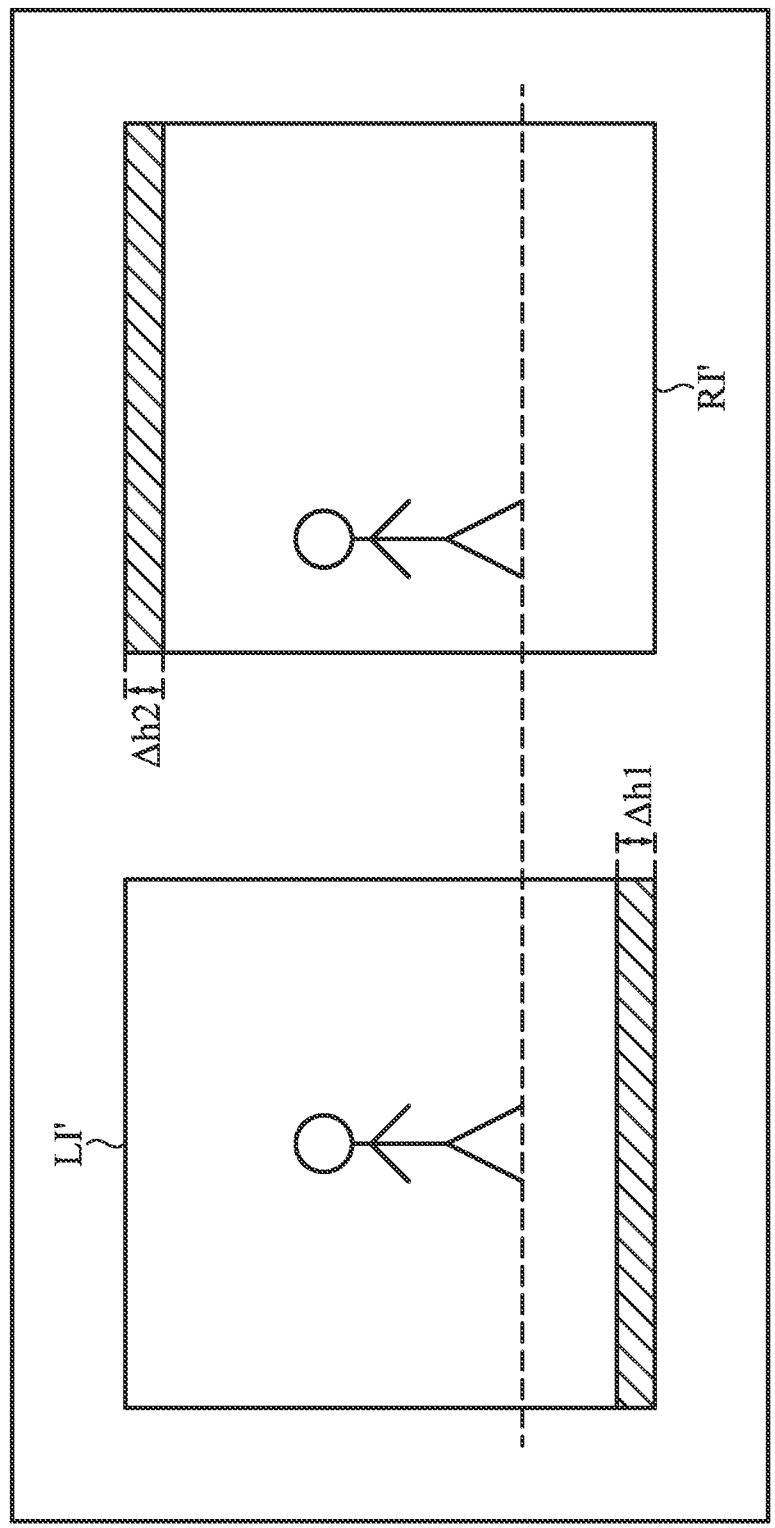
FIG. 7 shows the horizontally aligned left- and right-eye images LI' and RI', generated in accordance with the similar rows observed in the disclosure.

FIG. 7 shows the horizontally aligned left- and right-eye images LI' and RI', generated in accordance with the similar rows observed in the disclosure. Comparing FIG. 4 with FIG. 7, the left-eye image LI' of FIG. 7 is created by shifting the left-eye image LI of FIG. 4 upward by an offset $\Delta h1$, and the right-eye image RI' of FIG. 7 is created by shifting the right-eye image RI of FIG. 4 downward by an offset $\Delta h2$. The level difference $\Delta h$ between the left- and right images LI and RI is compensated for by the vertical shifts $\Delta h1$ and $\Delta h2$. Thus, horizontal alignment between the left- and right-eye images is achieved to perfectly generate a 3D image.

Figure 8:
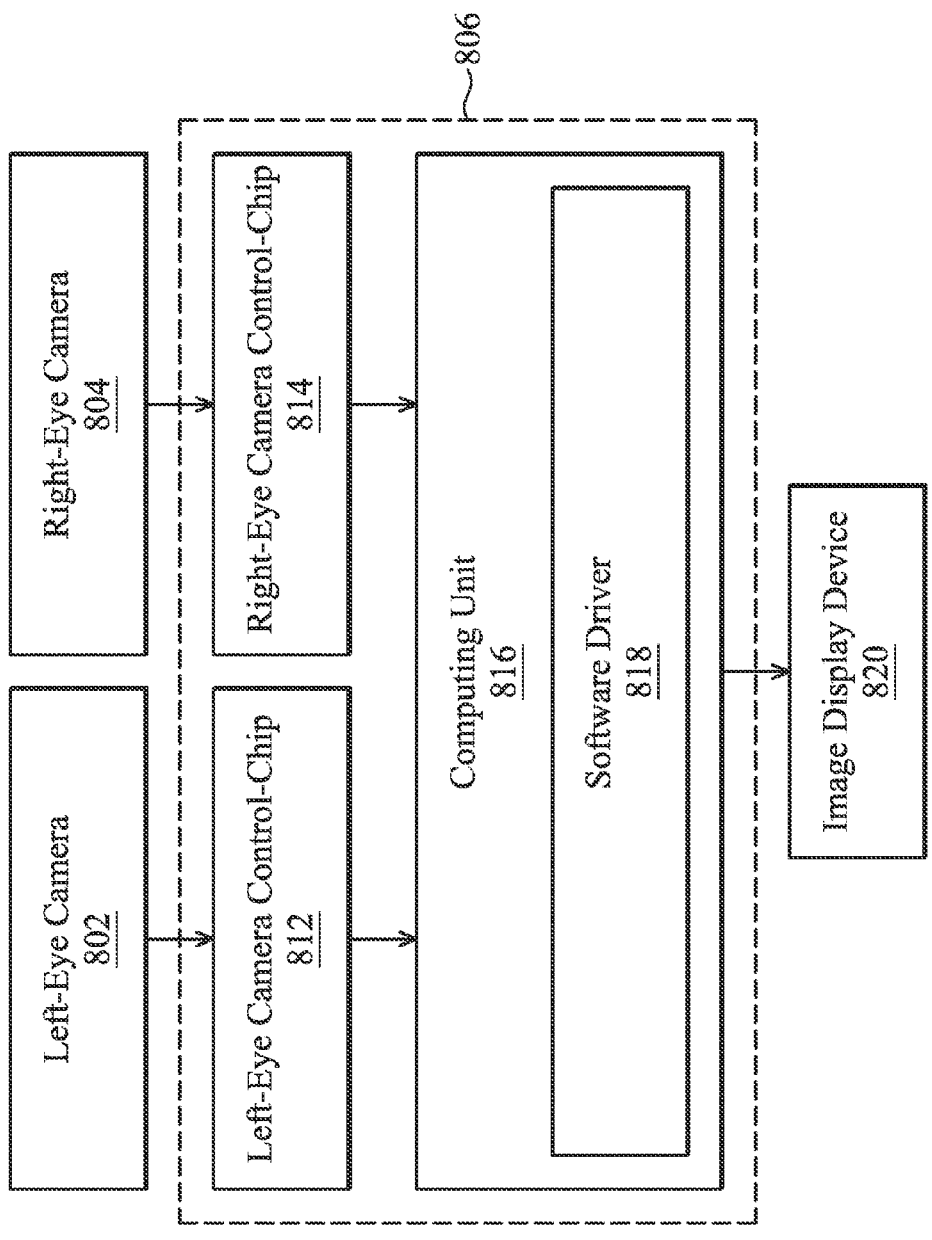
FIG. 8 depicts a 3D camera 800 in accordance with an exemplary embodiment of the invention.

FIG. 8 depicts a 3D camera 800 in accordance with an exemplary embodiment of the invention. The 3D camera 800 comprises a left-eye camera 802, a right-eye camera 804 and a control module 806. The control module 806 is configured to: control the left-eye camera 802 to capture a left-eye image and control the right-eye camera 804 to capture a right-eye image; compare the left- and right-eye images to observe similar columns between the left- and right-eye images and thereby obtain a first-column range in the left-eye image and a second-column range in the right-eye image which indicate similar columns; compare the left-eye image within the first-column range with the right-eye image within the second-column range to observe similar rows between the left- and right-eye images and thereby obtain a first-row range in the left-eye image and a second-row range in the right-eye image which indicate similar rows; and, in accordance with the first-row range obtained in the left-eye image and the second-row range obtained in the right-eye image, vertically shift the left- and right-eye images to horizontally align the left- and right-eye images to generate a 3D image.

In the embodiment of FIG. 8, the control module 806 comprises a left-eye camera-control chip 812, a right-eye camera-control chip 814 and a computing unit 816 connected with the left-eye and right-eye camera-control chips 812 and 814. The left-eye camera-control chip 812 controls the left-eye camera 802 to capture a left-eye image. The right-eye camera-control chip 814 controls the right-eye camera to capture a right-eye image. The computing unit 816 executes a software driver 818 to implement the disclosed observation of the similar columns and similar rows between the left-eye and right-eye images and the horizontal alignment between the left- and right-eye images. In other exemplary embodiments, the control module may be implemented by software or hardware or a software/hardware co-design.

In the 3D camera of FIG. 8, the software driver 818 may provide a function of 3D image synthesis. In cases wherein the 3D camera 800 further comprises an image display device 820, the software driver 818 may further drive the image display device 820 to display the synthesized 3D image.

Figure 9:
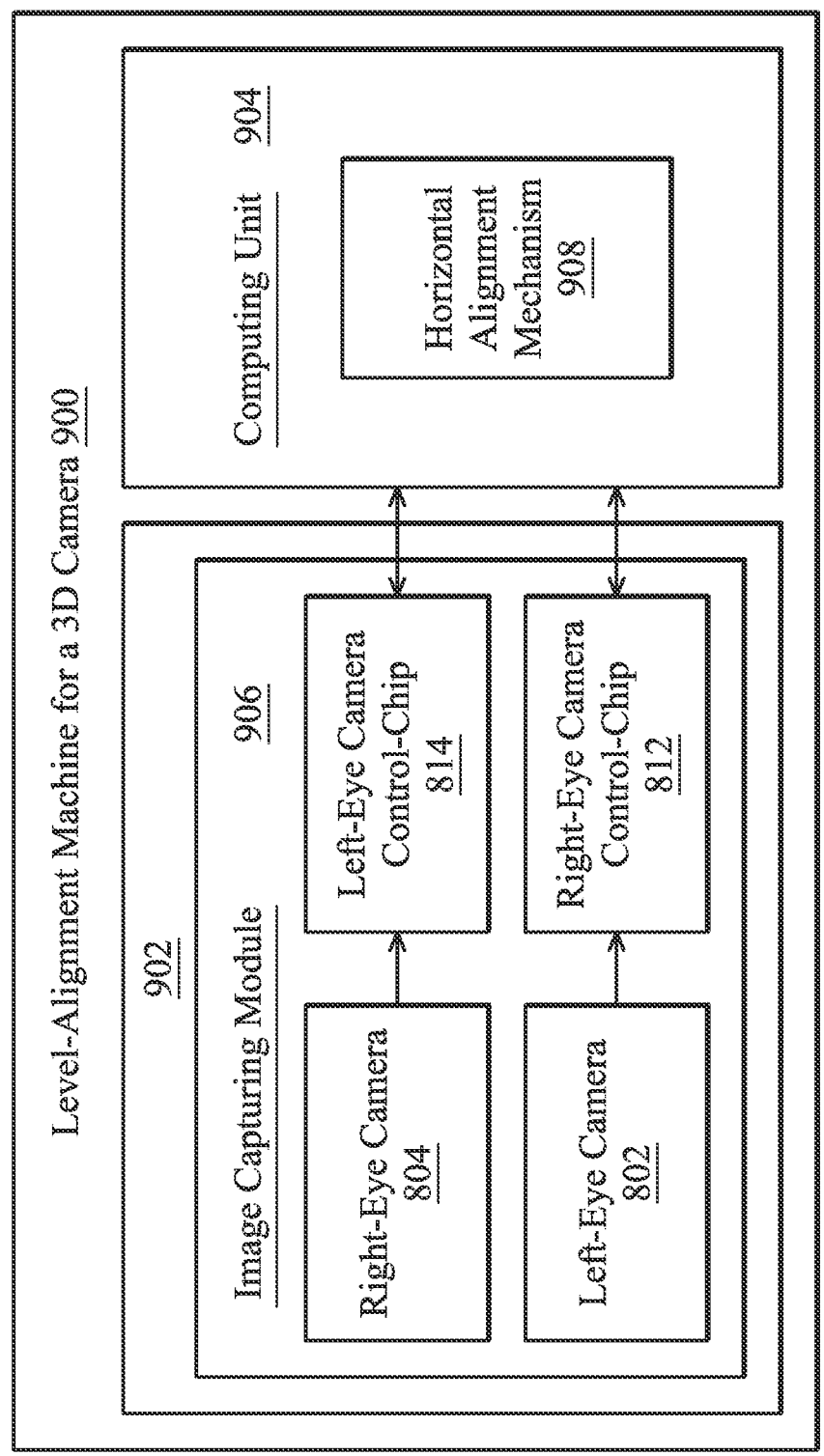
FIG. 9 depicts a level-alignment machine 900 for a 3D camera, based on an exemplary embodiment of the invention.

FIG. 9 depicts a level-alignment machine 900 for a 3D camera, which comprises: a connection seat 902 and a computing unit 904 coupled to the connection seat 902. An image-capturing module 906 is assembled to the level-alignment machine 900 through the connection seat 902. The image-capturing module 906 is operative to capture a left-eye image and a right-eye image required in generating a 3D image. The image-capturing module 906 may include the left-eye camera 802, the right-eye camera 804 and the left- and right-eye camera-control chips 812 and 814 shown in FIG. 8. The computing unit 904 is operative to receive the left- and right-eye images captured by the image-capturing module 906 to perform a horizontal alignment mechanism 908 thereupon. According to the horizontal alignment mechanism 908, the following steps are performed: comparing the left-eye image with the right-eye image to observe similar columns between the left- and right-eye images and thereby a first-column range in the left-eye image and a second-column range in the right-eye image are obtained to indicate similar columns; comparing the left-eye image within the first-column range with the right-eye image within the second-column range to observe similar rows between the left- and right-eye images and thereby a first-row range in the left-eye image and a second-row range in the right-eye image are obtained to indicate similar rows; and, in accordance with the first-row range obtained in the left-eye image and the second-row range obtained in the right-eye image, setting a left-eye image vertical shift parameter and a right-eye image vertical shift parameter to vertically shift the left- and right-eye images captured by the image-capturing module 906 accordingly for horizontal alignment between the left- and right-eye images. The image-capturing module 906 loaded with the left- and right-eye image vertical shift parameters may be assembled to the 3D camera 800 of FIG. 8.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A 3D image-capturing method, comprising:

using a left-eye camera to capture a left-eye image and using a right-eye camera to capture a right-eye image;

comparing the left- and right-eye images to observe similar columns between the left- and right-eye images and thereby obtain a first-column range in the left-eye image and a second-column range in the right-eye image which indicate similar columns;

comparing the left-eye image within the first-column range with the right-eye image within the second-column range to observe similar rows between the left- and right-eye images and thereby obtain a first-row range in the left-eye image and a second-row range in the right-eye image which indicate similar rows; and vertically shifting the left- and right-eye images in accordance with the first-row range obtained in the left-eye image and the second-row range obtained in the right-eye image to horizontally align the left- and right-eye images to generate a 3D image, wherein the step of observing the first-column range in the left-eye image and the second-column range in the right-eye image further comprises:

estimating vertical projections of the left- and right-eye images;

differentiating the vertical projections of the left- and right-eye images to obtain first-order differentiated vertical projections of the left- and right-eye images; and shifting the first-order differentiated vertical projections of the left- and right-eye images relative to each other step by step with comparisons between each shift and thereby the first-column range in the left-eye image and the second-column range in the right-eye image are obtained.

2. The 3D image-capturing method as claimed in claim 1, wherein the step of observing the first-row range in the left-eye image and the second-row range in the right-eye image further comprises:
estimating a horizontal projection for the left-eye image within the first-column range and a horizontal projection for the right-eye image within the second-column range;
shifting the horizontal projections of the left- and right-eye images relative to each other step by step with comparisons between each shift, and thereby the first-row range in the left-eye image and the second-row range in the right-eye image are obtained.

3. The 3D image-capturing method as claimed in claim 1, wherein the step of observing the first-row range in the left-eye image and the second-row range in the right-eye image further comprises:
estimating a horizontal projection for the left-eye image within the first-column range and a horizontal projection for the right-eye image within the second-column range;
differentiating the horizontal projections of the left- and right-eye images, respectively, to obtain first-order differentiated horizontal projections of the left- and right-eye images; and
shifting the first-order differentiated horizontal projections of the left- and right-eye images relative to each other step by step with comparisons between each shift and thereby the first-row range in the left-eye image and the second-row range in the right-eye image are obtained.

4. A 3D camera, comprising:
a left-eye camera;
a right-eye camera; and
a control module, controlling the left-eye camera to capture a left-eye image and controlling the right-eye camera to capture a right-eye image, comparing the left- and right-eye images to observe similar columns between the left- and right-eye images and thereby obtain a first-column range in the left-eye image and a second-column range in the right-eye image which indicate similar columns, comparing the left-eye image within the first-column range with the right-eye image within the second-column range to observe similar rows between the left- and right-eye images and thereby obtain a first-row range in the left-eye image and a second-row range in the right-eye image which indicate similar rows, and, in accordance with the first-row range obtained in the left-eye image and the second-row range obtained in the right-eye image, vertically shifting the left- and right-eye images to horizontally align the left- and right-eye images for the generation of a 3D image,
wherein the control module further estimates vertical projections of the left- and right-eye images, differentiates the vertical projections of the left- and right-eye images to obtain first-order differentiated vertical projections of the left- and right-eye images, and shifts the first-order differentiated vertical projections of the left- and right-eye images relative to each other step by step with comparisons between each shift and thereby the first-column range in the left-eye image and the second-column range in the right-eye image are obtained.

5. The 3D camera as claimed in claim 4, wherein the control module comprises:
a left-eye camera-control chip, controlling the left-eye camera to capture the left-eye image;
a right-eye camera-control chip, controlling the right-eye camera to capture the right-eye image;
a computing unit connected to the left- and right-eye camera-control chips, wherein the computing unit is configured to execute a software driver for observation of the first and second-column ranges and the first and second-row ranges and for horizontal alignment between the left- and right-eye images.

6. The 3D camera as claimed in claim 5, wherein the software driver is further executed for 3D image synthesis.

7. The 3D camera as claimed in claim 6, further comprising an image display device, wherein the image display device is driven according to the executed software driver to display the 3D image.

8. A level-alignment machine for a 3D camera, comprising:
a connection seat, by which an image-capturing module is assembled to the level-alignment machine, wherein the image-capturing module is operative to capture a left-eye image and a right-eye image required in generation of a 3D image;
a computing unit coupled to the connection seat and configured to receive the left- and right-eye images captured by the image-capturing module, comparing the left- and right-eye images to observe similar columns between the left- and right-eye images and thereby obtain a first-column range in the left-eye image and a second-column range in the right-eye image which indicate similar columns, comparing the left-eye image within the first-column range with the right-eye image within the second-column range to observe similar rows between the left- and right-eye images and thereby obtain a first-row range in the left-eye image and a second-row range in the right-eye image which indicate similar rows, and setting a left-eye image vertical shift parameter and a right-eye image vertical shift parameter based on the first-row range obtained in the left-eye image and the second-row range obtained in the right-eye image, to vertically shift the left- and right-eye images based on the first and second vertical shift parameters for horizontal alignment between the left- and right-eye images,
wherein the computing unit further estimates vertical projections of the left- and right-eye images, differentiates the vertical projections of the left- and right-eye images to obtain first-order differentiated vertical projections of the left- and right-eye images, and shifts the first-order differentiated vertical projections of the left- and right-eye images relative to each other step by step with comparisons between each shift and thereby the first-column range in the left-eye image and the second-column range in the right-eye image are obtained.

9. A 3D image-capturing method, comprising:
using a left-eye camera to capture a left-eye image and using a right-eye camera to capture a right-eye image;
comparing the left- and right-eye images to observe similar columns between the left- and right-eye images and thereby obtain a first-column range in the left-eye image and a second-column range in the right-eye image which indicate similar columns;
comparing the left-eye image within the first-column range with the right-eye image within the second-column range to observe similar rows between the left- and right-eye images and thereby obtain a first-row range in the left-eye image and a second-row range in the right-eye image which indicate similar rows; and
vertically shifting the left- and right-eye images in accordance with the first-row range obtained in the left-eye image and the second-row range obtained in the right-eye image to horizontally align the left- and right-eye images to generate a 3D image, wherein the step of observing the first-row range in the left-eye image and the second-row range in the right-eye image further comprises:
  estimating a horizontal projection for the left-eye image within the first-column range and a horizontal projection for the right-eye image within the second-column range;
  differentiating the horizontal projections of the left- and right-eye images, respectively, to obtain first-order differentiated horizontal projections of the left- and right-eye images; and
  shifting the first-order differentiated horizontal projections of the left- and right-eye images relative to each other step by step with comparisons between each shift and thereby the first-row range in the left-eye image and the second-row range in the right-eye image are obtained.

10. The 3D image-capturing method as claimed in claim 9, wherein the step of obtaining the first-column range in the left-eye image and the second-column range in the right-eye image further comprises:
  estimating vertical projections of the left- and right-eye images;
  shifting the vertical projections of the left- and right-eye images relative to each other step by step with comparisons between each shift and thereby the first-column range in the left-eye image and the second-column range in the right-eye image are obtained.

11. The 3D image-capturing method as claimed in claim 9, wherein the step of observing the first-column range in the left-eye image and the second-column range in the right-eye image further comprises:
  estimating vertical projections of the left- and right-eye images;
  differentiating the vertical projections of the left- and right-eye images to obtain first-order differentiated vertical projections of the left- and right-eye images; and
  shifting the first-order differentiated vertical projections of the left- and right-eye images relative to each other step by step with comparisons between each shift and thereby the first-column range in the left-eye image and the second-column range in the right-eye image are obtained.

12. A 3D camera, comprising:
  a left-eye camera;
  a right-eye camera; and
  a control module, controlling the left-eye camera to capture a left-eye image and controlling the right-eye camera to capture a right-eye image, comparing the left- and right-eye images to observe similar columns between the left- and right-eye images and thereby obtain a first-column range in the left-eye image and a second-column range in the right-eye image which indicate similar columns, comparing the left-eye image within the first-column range with the right-eye image within the second-column range to observe similar rows between the left- and right-eye images and thereby obtain a first-row range in the left-eye image and a second-row range in the right-eye image which indicate similar rows, and, in accordance with the first-row range obtained in the left-eye image and the second-row range obtained in the right-eye image, vertically shifting the left- and right-eye images to horizontally align the left- and right-eye images for the generation of a 3D image,
  wherein the control module further estimates a horizontal projection for the left-eye image within the first-column range and a horizontal projection for the right-eye image within the second-column range, differentiates the horizontal projections of the left- and right-eye images, respectively, to obtain first-order differentiated horizontal projections of the left- and right-eye images, and shifts the first-order differentiated horizontal projections of the left- and right-eye images relative to each other step by step with comparisons between each shift and thereby the first-row range in the left-eye image and the second-row range in the right-eye image are obtained.

13. The 3D camera as claimed in claim 12, wherein the control module comprises:
  a left-eye camera-control chip, controlling the left-eye camera to capture the left-eye image;
  a right-eye camera-control chip, controlling the right-eye camera to capture the right-eye image;
  a computing unit connected to the left- and right-eye camera-control chips, wherein the computing unit is configured to execute a software driver for observation of the first and second-column ranges and the first and second-row ranges and for horizontal alignment between the left- and right-eye images.

14. The 3D camera as claimed in claim 13, wherein the software driver is further executed for 3D image synthesis.

15. The 3D camera as claimed in claim 14, further comprising an image display device, wherein the image display device is driven according to the executed software driver to display the 3D image.

16. A level-alignment machine for a 3D camera, comprising:
  a connection seat, by which an image-capturing module is assembled to the level-alignment machine, wherein the image-capturing module is operative to capture a left-eye image and a right-eye image required in generation of a 3D image;
  a computing unit coupled to the connection seat and configured to receive the left- and right-eye images captured by the image-capturing module, comparing the left- and right-eye images to observe similar columns between the left- and right-eye images and thereby obtain a first-column range in the left-eye image and a second-column range in the right-eye image which indicate similar columns, comparing the left-eye image within the first-column range with the right-eye image within the second-column range to observe similar rows between the left- and right-eye images and thereby obtain a first-row range in the left-eye image and a second-row range in the right-eye image which indicate similar rows, and setting a left-eye image vertical shift parameter and a right-eye image vertical shift parameter based on the first-row range obtained in the left-eye image and the second-row range obtained in the right-eye image, to vertically shift the left- and right-eye images based on the first and second vertical shift parameters for horizontal alignment between the left- and right-eye images,
  wherein the computing unit further estimates a horizontal projection for the left-eye image within the first-column range and a horizontal projection for the right-eye image within the second-column range, differentiates the horizontal projections of the left- and right-eye images, respectively, to obtain first-order differentiated horizontal projections of the left- and right-eye images, and shifts the first-order differentiated horizontal projections of the left- and right-eye images relative to each other step by step with comparisons between each shift and thereby the first-row range in the left-eye image and the second-row range in the right-eye image are obtained.

* * * * *